US006364515B1

(12) United States Patent
Daub et al.

(10) Patent No.: US 6,364,515 B1
(45) Date of Patent: Apr. 2, 2002

(54) DEVICE FOR RECEIVING A GAS DISCHARGE LAMP OF A VEHICLE HEADLIGHT

(75) Inventors: Wolfgang Daub, Anroechte; Stefan Moeller, Lippstadt; Detlef Niggemann, Bueren-Steinhausen; Gerhard Rotgeri, Geseke; Gerhard Stumpe, Lippstadt; Torsten Tamcke, Bremen, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/654,061

(22) Filed: Sep. 1, 2000

(30) Foreign Application Priority Data

Sep. 1, 1999 (DE) ........................................ 199 41 538

(51) Int. Cl.$^{7}$ .................................................. B60Q 1/00

(52) U.S. Cl. ....................... 362/548; 362/226; 362/263; 362/265

(58) Field of Search ................................ 362/226, 263, 362/265, 548; 439/239, 375, 617

(56) References Cited

U.S. PATENT DOCUMENTS

| | | | | | |
|---|---|---|---|---|---|
| 6,076,941 | A | * | 6/2000 | Hass et al. | 362/263 |
| 6,082,883 | A | * | 7/2000 | Tatsumi et al. | 362/226 |

FOREIGN PATENT DOCUMENTS

| | | |
|---|---|---|
| DE | A1-4024495 | 2/1992 |
| DE | A1-4334721 | 4/1995 |
| DE | A1-4445223 | 6/1996 |

* cited by examiner

*Primary Examiner*—Stephen Husar
*Assistant Examiner*—Guiyoung Lee

(57) ABSTRACT

A device for receiving a gas discharge lamp of an automotive headlight has a housing (1) in which an igniting apparatus is arranged. This housing (1) also has an insertion opening (2) with recesses (4) at an edge in an outer wall (3) of the housing for receiving a lamp base with radially projecting bayonet lugs (18) on the base, said lugs axially securing the lamp base (17) in the insertion opening (2) when the lamp base is turned into a locked rotational position. A box (9) is also provided on the housing (1) for a feeder plug (11) which provides an electric power supply. With such a device having an integrated igniting apparatus, mechanical locking is provided for the box arranged on the housing to prevent insertion of the feeder plug as long as a bayonet connection of a base of gas discharge lamp is not in the locked rotational position. That is, a latch (13) in the housing (1) is arranged such that at least one of the bayonet lugs (18) of the lamp base (17) inserted into the insertion opening (2) can be linked with this latch, and when the lamp base (17) is turned into the unlocked rotational position, the latch is carried with it into a blocking position in which it projects into the plug area (10) of the box (9) on the housing (1).

10 Claims, 4 Drawing Sheets

DEVICE FOR RECEIVING A GAS DISCHARGE LAMP OF A VEHICLE HEADLIGHT

BACKGROUND OF THE INVENTION

This application claims a priority from German application 199 41 538.2, filed Sep. 1, 1999, and the contents of that priority application are incorporated herein by reference.

This invention relates to a device for receiving a gas discharge lamp of a type including a housing in which is arranged an igniting apparatus and which has an insertion opening in an outer wall thereof with recesses at an edge of the insertion opening for receiving radially projecting bayonet lugs of a lamp base inserted into the insertion opening for securing the lamp base axially when the lamp base is rotated into a locked rotational position, said device including a box on the housing for a feeder plug which provides an electric power supply.

Gas discharge lamps for vehicle headlights with a bayonet lock between the lamp base and a lamp receptacle are known. When no gas discharge lamp is inserted in the lamp receptacle, contacts for the power supply of the lamp are exposed. Thus, they are accessible when the gas discharge lamp is replaced, for example.

Gas discharge lamps must be supplied with a high voltage for the ignition process, thus care must be taken to ensure that the contacts which are exposed when a lamp is not inserted into the receptacle do not carry a voltage in order to ensure protection of anyone coming in contact with them. With automotive headlights that do not belong to this generic type, it is provided that a lamp receiver is arranged to have a first plug part which can be connected to a second plug part for an electric connection. Access to the lamp receptacle and thus to the gas discharge lamp requires that first the connection of the two plug parts be released, so that the lamp base does not carry a voltage (see German Patent Application 44 45 223 A1).

It is an object of this invention to provide a device for receiving a gas discharge lamp of the type mentioned in the opening paragraph above, having an integrated ignition device, which has mechanical blocking of a feeder-plug-insertion box arranged on the housing as long as a bayonet connection of a base of a gas discharge lamp is not in a locked rotational position therein.

SUMMARY OF THE INVENTION

According to principles of this invention, a latch is arranged in the housing such that the latch can be linked to at least one of bayonet lugs of a lamp base inserted into an insertion opening of the housing so that when the lamp base is rotated to the unlocked position, said latch is carried with it into a blocking position projecting into a plug area of a box on the housing.

It is essential for this invention that the latch which is movably arranged in the device housing is at the plug-in area of the box for the feeder plug if the base of the gas discharge lamp is not inserted into the lamp receptacle and screwed into the locked rotational position. As long as the latch is blocking the plug-in area of the box, the feeder plug cannot be inserted into it. Thus, the electric connection of the ignition device is interrupted, and the exposed contacts in the lamp base for the electric power supply to the gas discharge lamp are, accordingly, voltage free. For one thing, a coordination between the rotational position of the lamp base and the latch can make it so that it is impossible to turn the gas discharge lamp to the unlocked position when the feeder plug is inserted in the box. For another thing, it is possible for the feeder plug to be thrown out of the box on the device housing by the latch when the gas discharge lamp is turned to the unlocked position. A preferred embodiment of this invention involves providing a stop that can be overcome in the plug area of the box, with the latch engaging behind this stop in its rotational locked position, so that the latch cannot be pressed back into its unlocked position by pushing the feeder plug in the box. The latch can be secured in its final locked position especially well by a form-fitting interengagement which can be overcome by a specific manipulation.

Additional advantageous enhancements of this invention are possible in further embodiments.

BRIEF DESCRIPTIONS OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout. The drawings are not necessarily to scale, emphasis instead being placed upon illustrating principles of the invention in a clear manner.

DETAILED DESCRIPTION OF A PREFERRED EMBODIMENT

Figure 1:
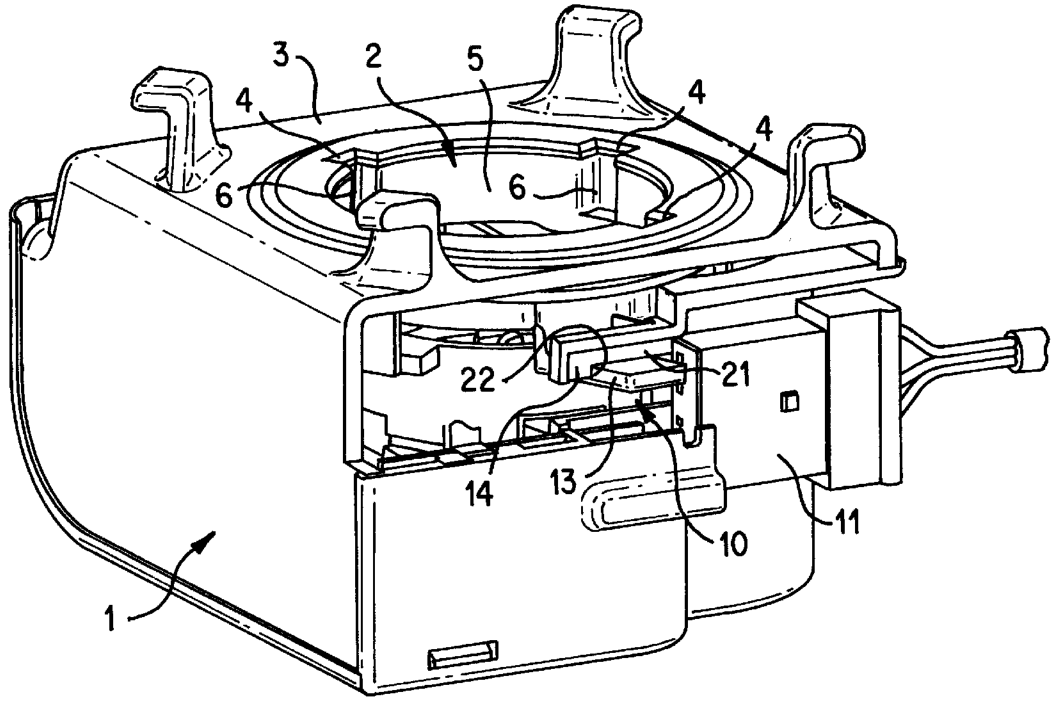
FIG. 1 is a perspective view of a device of this invention, with an integrated igniting apparatus, for receiving a gas discharge lamp, but without such a lamp inserted.
Figure 3:
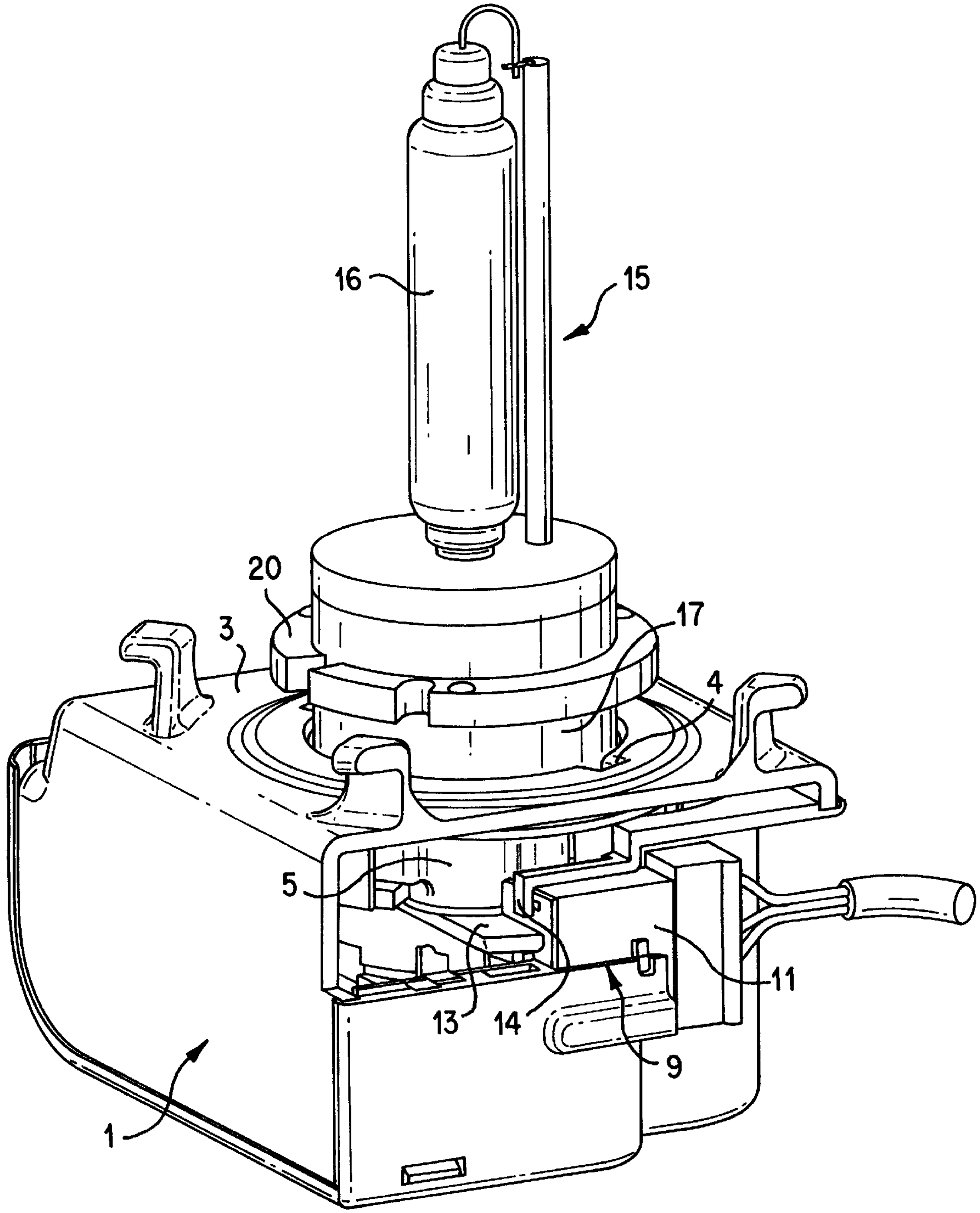
FIG. 3 is a perspective view of the device of FIG. 1, but with a gas discharge lamp inserted therein.
Figure 4:
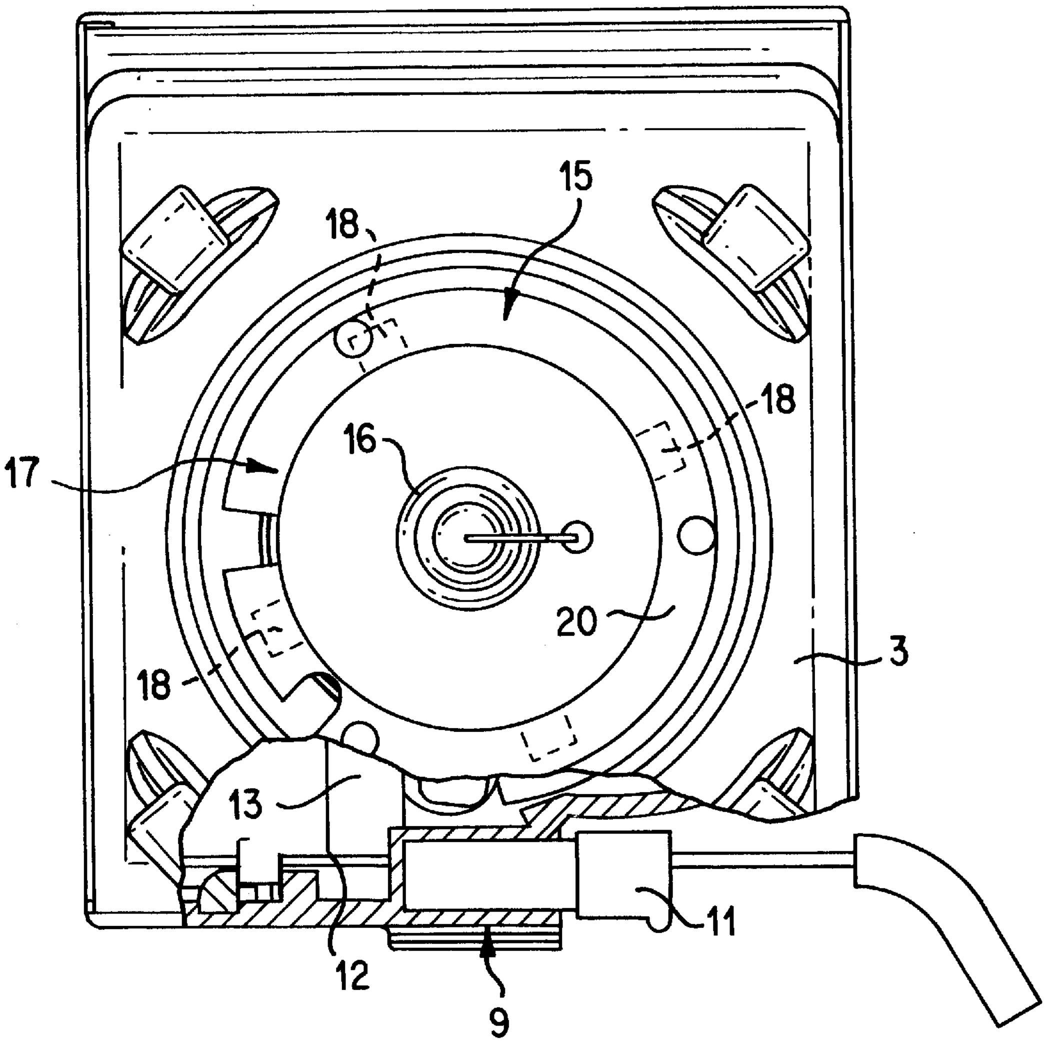
FIG. 4 is a top view of the device of FIG. 3.

FIG. 1 shows in some detail a so-called ignition device, or ballast, which has a housing 1 in which is arranged an igniting apparatus, which is not shown in detail in the drawing, for receiving a gas discharge lamp 15 which can be seen in FIGS. 3 and 4. The approximately cube-shaped housing 1 has on its front side an insertion opening 2 for a base 17 of the gas discharge lamp 15 which is inserted into the housing 1 and accordingly passes through a front outer wall 3 of the housing 1. Diametrically opposed recesses 4 are in this outer wall 3 at an edge in the area of the insertion opening 2 which recesses are necessary for a bayonet connection in which the base 17 of the gas discharge lamp 15 is inserted into the insertion opening 2 in an axial direction and is then secured in the axial direction by turning the lamp by a certain angle. For this purpose, radially projecting bayonet lugs 18 are arranged on the base 17 of the gas discharge lamp 15, as shown in FIG. 4.

In addition, FIG. 1 depicts a locking ring 5 arranged in the housing 1 so that it surrounds the insertion opening 2 beneath the outer wall 3 of the housing 1. Accordingly, an inside diameter of the locking ring 5 corresponds to the diameter of the insertion opening 2, and the locking ring 5 is also adapted to the bayonet locking of the base 17 of the gas discharge lamp 15. For this purpose, it has axially-parallel receiving grooves 6 for the bayonet lugs 18 on the lamp base 17 which are aligned with the recesses 4 on the edge of the insertion opening 2 in the outer wall 3 of the housing when the lamp is in an unlocked rotational position.

The bayonet lock requires that the gas discharge lamp 15 inserted into the insertion opening 2 be rotated clockwise a predetermined angle. When in the locked position, the bayonet lugs 18 on the lamp base 17 engage a bottom side of the outer wall 3 of the housing away from the recesses 4, thus securing the gas discharge lamp 15 axially. When the gas discharge lamp 15 is turned from the unlocked position into the locked position, the locking ring 5 is carried with it by the bayonet lugs 18 on the lamp base 17; thus, the locking ring is accordingly rotatably supported in housing 1.

Figure 2:
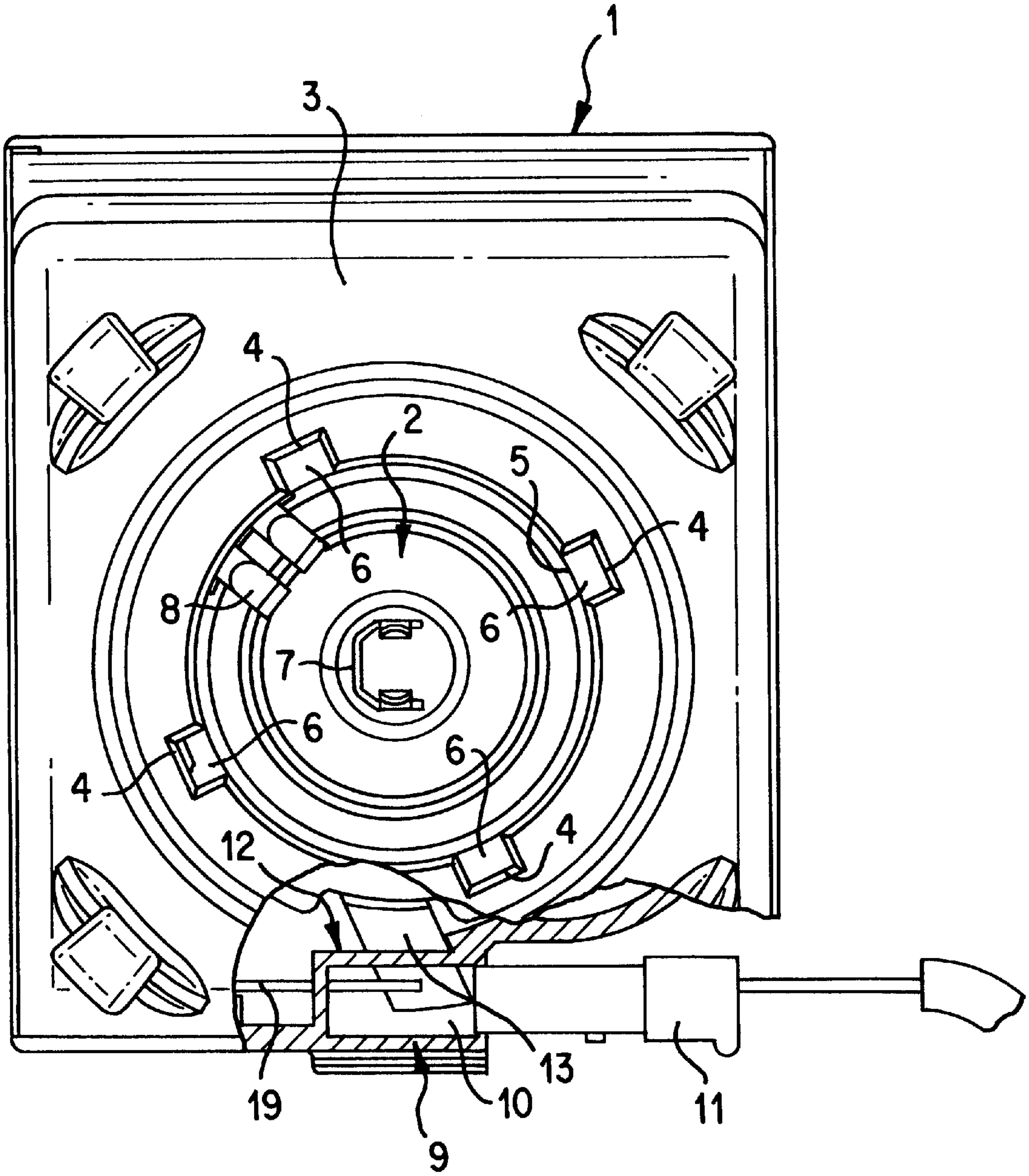
FIG. 2 is a top view of the device of FIG. 1.

FIG. 2 also shows the unlocked rotational position of the locking ring 5 in which the corresponding gas discharge lamp 15 can be inserted into, or removed from, the insertion opening 2. When the gas discharge lamp 15 is removed, contacts 7 and 8, which are necessary for electric power supply, are exposed, so that a service person might touch these contacts, possibly with a current conducting tool. The igniting apparatus in the housing 1 supplies a life-threatening high voltage to these contacts 7 and 8. Therefore, an electric feed to the ignition device is interrupted or suppressed as soon as the locking ring 5 is turned into the unlocked position.

The electric feed to the ignition device, and the igniting apparatus arranged in it, is accomplished through a receptacle, or box 9 arranged on the outside of the housing 1 to have a plug area 10 in which a feeder plug 11 can be received. Suitable contact pins 19, which are provided for this, are connected electrically in the usual manner to the igniting apparatus (not shown) and the contacts 7 and 8 in the interior of the housing 1. At the plug area 10, the receptacle box 9 has a side opening 12 which is provided to allow a latch 13 to pass therethrough. This latch 13 is part of the locking ring 5, projecting from an outside of the locking ring 5 at a slight incline to the radial direction, toward the counter clockwise direction. In the locked rotational position of the locking ring 5, the latch 13 protrudes so far into the plug area 10 of the box 9 that the feeder plug 11 cannot be inserted therein. This is particularly illustrated in FIG. 2, where the feeder plug 11 is shown in front of the insertion opening of the box 9. If the feeder plug 11 is in the plug area 10 of the box 9 and then the locking ring 5 is carried by the bayonet lugs 18 of the lamp base 17 out of its locked position, as particular shown in FIG. 4, and into its unlocked position, as shown in FIG. 2, then the feeder plug 11 is thrown out of the box 9 by the latch 13 on the locking ring 5. The locked position of the locking ring 5 is understood to be the position in which the recesses 4 on the edge of the insertion opening 2 are not aligned with the receiving grooves 6 of the locking ring 5, and is thus a position in which the bayonet connection has been established to secure the lamp base 17.

A stop 14 is provided for the latch 13 in the plug area of the box 9. This stop prevents the locking ring 5 from being turned into the unlocked position via the latch 13 when the locking ring 5 is in the locked position due to pressure on the plug 11 in the box 9. Accordingly, when the locking ring 5 is turned, the latch 13 snaps behind the stop 14 in the locked position, which engagement can only be overcome by a specific manipulation. Consequently, latch 13 also assumes a locked position when engaged on stop 14, corresponding to the locked position of the locking ring 5.

In order for the latch 13 to overcome the stop 14, the locking ring 5, together with the latch 13 formed thereon as one piece, is displaceable in the direction of the axis of the insertion opening 2, and it is acted upon by a spring which presses the locking ring 5 in the direction of the front housing wall 3. This spring is not shown in the drawing. Thus, from the unlocked position, in addition to turning the locking ring 5 by means of the lamp base 17, an axial pressure must also be exerted on the lamp base 17 in the direction of the interior of the housing 1 to thereby disengage the latch 13 from the stop 14. Also in an opposite rotational direction, from the locked position to the unlocked position, it can be provided that the latch 13 overrides the stop 14 with the unlocked position being reached only when the locking ring 5 is first depressed by the lamp base 17 so that it can then be turned further into the unlocked position. As FIG. 1 also shows, the plug area 10 of the box 9 is covered above by a wall 21 on which a shoulder 22 projecting downwardly is formed at an inner end of the plug area 10. This shoulder 22 is a main element of the stop 14, because the latch 13 rests on it in the locked position, with the latch 13 of the locking ring 5 being held in this position by the above-mentioned spring whose force must be overcome in a deliberate manner by depressing the locking ring 5.

FIGS. 3 and 4 also show details of the gas discharge lamp 15. It has a burner 16 connected to the lamp base 17 in the axial direction. The lamp base 17 has a base plate 20 projecting radially, facilitating handling of the gas discharge lamp 15, particular for pushing it in the direction toward the interior of the housing 1, as mentioned above, and turning it between the unlocked position and the locked positions.

We claim:

1. A device for receiving a gas discharge lamp of a vehicle headlight, including a housing (1) in which is arranged an igniting apparatus and which has an insertion opening (2) in an outer wall (3) thereof with recesses (4) at an edge of the insertion opening (2) for receiving radially projecting bayonet lugs (18) of a lamp base (17) to be inserted into the insertion opening for securing the lamp base (17) axially when the lamp base is turned into a locked rotational position, said device including a receptacle (9) on the housing (1) for receiving a removable feeder plug (11) in a plug area (10) thereof, which is electrically coupled to an electric power supply for supplying electric power to said device, wherein:

a latch (13) is arranged in the housing (1) for being linked to at least one of the bayonet lugs (18) of the lamp base (17) when it is inserted into the insertion opening (2) so that when the lamp base is rotated to an unlocked rotational position, said latch is carried with it into a blocking position projecting into the plug area (10) of the receptacle (9) on the housing (1) for preventing said feeder plug from being in said plug area of said receptacle.

2. Device according to claim 1 wherein the latch (13) is part of a locking ring (5) arranged coaxially with the insertion opening (2) in the housing (1) to be rotatably supported in a circumferential direction, with the latch (13) projecting radially outwardly on said locking ring.

3. Device according to claim 2 wherein the locking ring (5) has an inside diameter which is similar to the diameter of the insertion opening (2) in the area of the outer wall (3) of the housing (1).

4. Device according to claim 3 wherein the locking ring (5) has axially parallel receiving grooves (6) for receiving bayonet lugs (18) of the lamp base (17) on its inside which align with the recesses (4) in the outer wall (3) of the housing (1) in the area of the insertion opening (2) in the unlocked rotational position.

5. Device according to claim 1 wherein the receptacle (9) has a side opening (12) toward an interior of the housing (1) to allow the latch (13) to pass therethrough.

6. Device according to claim 5 wherein the plug area (10) of the receptacle (9) extends, in an insertion direction of the plug inserted thereinto, tangentially to a circular path along which the latch (13) pivots between the unlocked rotational position and the locked rotational position of the lamp base (17).

7. Device according to claim 2 wherein a stop (14) that can be overcome is provided in the plug area (10) of the receptacle (9), so that the latch (13) engages said stop in the locked rotational position for the purpose of preventing the latch from pivoting back into the unlocked pivot position.

8. Device according to claim 7 wherein the locking ring (5) is displaceable in its axial direction away from the outer wall (3) of the housing (1) with the insertion opening (2) against a force of a spring, so that when the locking ring (5) is axially displaced, a rotational path of the latch (13) is outside an area of engagement with the stop (14).

9. Device according to claim 8 wherein the plug area (10) of the receptacle (9) is covered by a housing wall (21) on a side facing the outer wall (3) of the housing (1) with the insertion opening (2), there being a shoulder (22) projecting away from this housing wall (21) formed on the housing wall, said shoulder forming said stop with the latch (13) engaging behind this shoulder in its locked rotational position.

10. Device according to claim 1 wherein if said feeder plug is located in said plug area of said receptacle when said lamp base is rotated to said unlocked rotational position, said feeder plug is engaged by said latch and forced out of said plug area, thereby breaking said electric power supply to said device.

* * * * *